(12) United States Patent
Pang et al.

(10) Patent No.: US 11,959,462 B2
(45) Date of Patent: Apr. 16, 2024

(54) CABIN COVER AND WIND TURBINE GENERATOR SET (71) Applicant: XINJIANG GOLDWIND SCIENCE & TECHNOLOGY CO., LTD., Urumqi (CN)

(72) Inventors: Hongzhi Pang, Beijing (CN); Ruiqing Shen, Beijing (CN); Lijia Qian, Beijing (CN); Hongkui Shi, Beijing (CN)

(73) Assignee: GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 69 days.

(21) Appl. No.: 17/780,506

(22) PCT Filed: Jul. 23, 2020

(86) PCT No.: PCT/CN2020/103813
§ 371 (c)(1),
(2) Date: May 26, 2022

(87) PCT Pub. No.: WO2021/103603
PCT Pub. Date: Jun. 3, 2021

(65) Prior Publication Data
US 2023/0013194 A1 Jan. 19, 2023

(30) Foreign Application Priority Data
Nov. 26, 2019 (CN) .......................... 201911175245.7

(51) Int. Cl.
F03D 80/00 (2016.01)
F03D 9/25 (2016.01)
F03D 13/20 (2016.01)

(52) U.S. Cl.
CPC ............... *F03D 80/00* (2016.05); *F03D 9/25* (2016.05); *F03D 13/20* (2016.05); *F05B 2240/14* (2013.01)

(58) Field of Classification Search
CPC . F03D 80/00; F03D 9/25; F03D 13/20; F05B 2240/14
See application file for complete search history.

(56) References Cited

U.S. PATENT DOCUMENTS 8,591,186 B2    11/2013  Christensen
D724,027 S  *    3/2015  Bitsch .......................... D13/115
(Continued)

FOREIGN PATENT DOCUMENTS

CN   101479470 A   7/2009
CN   201461268 U   5/2010
(Continued)

OTHER PUBLICATIONS

International Search Report in corresponding International Application No. PCT/CN2020/103813 dated Oct. 28, 2020 (12 pages).
(Continued)

*Primary Examiner* — Sean Gugger
(74) *Attorney, Agent, or Firm* — Bayes PLLC (57) ABSTRACT A cabin cover and a wind turbine generator set are provided. The cabin cover includes: a cover, the cover including first plates, second plates, and at least one support beam, the first plate and the second plate being alternately arranged, at least one group of adjacent first plate and second plate being spaced apart from each other and being fitted to the support beam, and the first plates, the second plates, and the support beams jointly enclosing an accommodating chamber; and fasteners, two or more of fasteners being provided and disposed in the accommodating chamber, at least one fastener detachably connecting the first plate to the support
(Continued)

beam, and at least one fastener detachably connecting the second plate to the support beam.

20 Claims, 8 Drawing Sheets

(56) References Cited

U.S. PATENT DOCUMENTS

| | | | |
|---|---|---|---|
| 2010/0034658 A1* | 2/2010 | Numajiri | F03D 13/10 29/889 |
| 2010/0239416 A1 | 9/2010 | Mogensen et al. | |
| 2011/0104797 A1 | 5/2011 | Kitta et al. | |
| 2011/0142616 A1* | 6/2011 | Christensen | F03D 80/00 415/224 |
| 2019/0136511 A1 | 5/2019 | Liingaard et al. | |
| 2019/0271297 A1* | 9/2019 | Kruse | F03D 13/10 |

FOREIGN PATENT DOCUMENTS

| | | |
|---|---|---|
| CN | 201521404 U | 7/2010 |
| CN | 201606194 U | 10/2010 |
| CN | 102062058 A | 5/2011 |
| CN | 102918262 A | 2/2013 |
| CN | 202811225 U | 3/2013 |
| CN | 202991363 U | 6/2013 |
| CN | 203009181 U | 6/2013 |
| CN | 204783476 U | 11/2015 |
| CN | 106640552 A | 5/2017 |
| CN | 206722987 U | 12/2017 |
| CN | 107740755 A | 2/2018 |
| CN | 208718847 U | 4/2019 |
| CN | 208950782 U | 6/2019 |
| CN | 209195602 U | 8/2019 |
| CN | 209324588 U | 8/2019 |
| DE | 102006001931 A1 | 7/2007 |
| DE | 202008010411 U1 | 10/2008 |
| EP | 2322795 A2 | 5/2011 |
| EP | 3372825 A1 | 9/2018 |
| JP | 5620009 B2 | 11/2014 |
| WO | 2018162588 A1 | 9/2018 |
| WO | 2019034214 A1 | 2/2019 |
| WO | 2019038709 A1 | 2/2019 |

OTHER PUBLICATIONS

Office Action in corresponding Chinese Application No. 201911175245.7 dated May 10, 2022 (9 pages).

Chen et al., Fracture Analysis of Flange Bolt Used for Structural Support of Wind-Power Generator Cabin, Inner Mongolia Electric Power (4 pages).

Second Office Action in corresponding Chinese Application No. 201911175245.7, dated Sep. 19, 2022 (9 pages).

Extended European Search Report in related European Application No. 20892467.0 dated Nov. 29, 2022 (8 pages).

Indian Office Action in related Indian Application No. 202217031460 dated Oct. 21, 2022 (5 pages).

* cited by examiner

CABIN COVER AND WIND TURBINE GENERATOR SET

CROSS-REFERENCE TO RELATED APPLICATIONS

This application is a national phase of International Application No. PCT/CN2020/103813, filed on Jul. 23, 3030, and claims the benefits of priority to Chinese Patent Application No. 201911175245.7, filed on Nov. 26, 2019. The entire contents of each of the above-identified applications are expressly incorporated herein by reference.

TECHNICAL FIELD

The present disclosure relates to a technical field of wind power, and specifically relates to a nacelle cover and a wind turbine generator.

BACKGROUND

The nacelle cover, as a protective shell of the wind turbine generator, can enclose multiple components of the wind turbine generator in it and protect them, and the reliability of the nacelle cover determines the stability requirements and service life of the wind turbine generator.

Due to unreasonable structural designs, the nacelle covers in the prior art have a lower strength after being formed by assembling various sheets, and meanwhile, the operator needs to climb to the outside of the nacelle cover and disassemble and assemble fasteners for connecting the various sheets when maintaining the nacelle cover, thereby bringing hidden dangers to the personal safety of the operators.

SUMMARY

Embodiments of the present disclosure provide a nacelle cover and a wind power generator, the nacelle cover can satisfy requirements on protection of multiple components of the wind power generator, and meanwhile, the nacelle cover has high strength and can ensure the personal safety of operators during maintenance.

On one aspect, the embodiments of the present application provide a nacelle cover, including: a cover casing, including a first plate, a second plate and at least one support beam, the first plate and the second plate being alternately arranged, adjacent first plate and second plate in at least one group being spaced apart from each other and holding the support beam between them, and the first plate, the second plate and the support beams being connected and jointly forming an accommodating chamber; and fasteners, wherein there are two or more fasteners disposed in the accommodating chamber, at least one fastener detachably connects the first plate to the support beam, and at least one fastener detachably connect the second plate to the support beam.

According to the implementation of one aspect of the present application, adjacent first plate and second plate in each group are spaced apart from each other and hold the support beam between them, and each support beam is at least partially located outside the accommodating chamber.

According to the implementation of one aspect of the present application, the support beam is formed as a prismatic member and includes a first surface and a second surface which are arranged to intersect each other, among the first plate and the second plate disposed adjacently and holding the support beam between them, the first plate is attached to the first surface and is connected to the support beam through at least one fastener, and the second plate is attached to the second surface and is connected to the support beam through at least one fastener.

According to the implementation of one aspect of the present application, the support beam includes a cavity penetrating through the support beam along its own extending direction, a positioning portion is disposed in the cavity, and the fastener is detachably connected to the support beam through the positioning portion.

According to the implementation of one aspect of the present application, each of an inner side of the first surface and an inner side of the second surface is provided with the positioning portion, the positioning portion includes an insertion body and a fixing body with an installation groove, the insertion body is inserted into the installation groove and is detachably connected to the fixing body, and the positioning portion is connected to the support beam through the fixing body and is detachably connected to the fastener through the insertion body.

According to the implementation of one aspect of the present application, the fixing body and the support beam are integrally formed, the installation groove penetrates through at least one end of the fixing body along the extending direction, the support beam includes an opening communicating with each installation groove, and the fastener extends into the installation groove through the opening opposite to the fastener and is threadedly connected to the insertion body.

According to the implementation of one aspect of the present application, a first through groove and a second through groove in communication with the first through groove are provided inside the fixing body, and with respect to the extending direction, a cross section enclosing the first through groove is larger than a cross section enclosing the second through groove, wherein the first through groove and the second through groove jointly form the installation groove, the insertion body is located in the first through groove, and the fastener penetrates through the insertion body and extends to the second through groove.

According to the implementation of one aspect of the present application, the support beam includes a first mounting plate, a second mounting plate and an inclined plate, the first mounting plate and the second mounting plate are arranged to intersect with each other, the first surface is located on the first mounting plate, the second surface is located on the second mounting plate, the inclined plate is arranged to intersect with the first mounting plate and the second mounting plate respectively, and the first mounting plate, the second mounting plate and the inclined plate enclose and form the cavity.

According to the implementation of one aspect of the present application, at least one first plate includes two or more first plate units, and the two or more first plate units are arranged successively along an extending direction of the support beam, and the first plate units each have a first bending portion and a first extending portion extending into the accommodating chamber; the first extending portions of two adjacent first plate units abut against each other and are detachably connected to each other, the first bending portion of each of the first plate units is pressed against the support beam, and the first bending portion of at least one of the first plate units is connected to the support beam through the fastener.

According to the implementation of one aspect of the present application, at least one second plate includes two or more second plate units, the two or more second plate units are arranged successively along an extending direction of the support beam, and the second plate units each have a second bending portion and a second extending portion extending into the accommodating chamber; the second extending portions of two adjacent second plate units abut against each other and are detachably connected to each other, the second bending portion of each of the second plate unis is pressed against the support beam, and the second bending portion of at least one of the second plate units is connected to the support beam through the fastener.

According to the implementation of one aspect of the present application, the nacelle cover further includes a support platform and a first adapter seat disposed in the accommodating chamber, the support platform is detachably connected to a surface of at least one first plate and/or at least one second plate facing the accommodating chamber through the first adapter seat.

According to the implementation of one aspect of the present application, the first adapter seat includes a first connecting portion and a second connecting portion which are arranged to intersect with each other, the first adapter seat is detachably connected to the first plate and/or the second plate through the first connecting portion, and the first adapter seat is detachably connected to the support platform through the second connecting portion.

According to the implementation of one aspect of the present application, the first connecting portion and the second connecting portion are both formed as plate-like members and are arranged perpendicular to each other.

According to the implementation of one aspect of the present application, the nacelle cover further includes a truss and a second adapter seat, one end of the truss is connected to the support beam through the second adapter seat, and the other end of the truss is connected to the support platform.

According to the implementation of one aspect of the present application, the second adapter seat includes a transition section, a first installation section and a second installation section, the first installation section and the second installation section are respectively connected to the transition section and extend opposite to each other, and the second adapter seat is connected to the support beam through the first installation section and is connected to the truss through the second installation section.

According to the implementation of one aspect of the present application, the transition section, the first installation section and the second installation section are formed into an integral member.

According to the implementation of one aspect of the present application, the transition section, the first installation section and the second installation section are formed as plate-like members, and the first installation section and the second installation section are respectively perpendicular to the transition section.

According to the implementation of one aspect of the present application, the cover casing further includes a first end plate and a second end plate, the first end plate is located at one end of the support beam along an extending direction of the support beam and is connected to the support beam, and the second end plate is located at the other end of the support beam along the extending direction of the support beam and is connected to the support beam.

According to the implementation of one aspect of the present application, the cover casing further includes a protrusion; a surface of at least one first plate close to and/or away from the accommodating chamber is provided with the protrusion; and/or, a surface of at least one second plate close to the accommodating chamber is provided with the protrusion.

On another aspect, the embodiments of the present application provide a wind turbine generator, including the above-mentioned nacelle cover.

BRIEF DESCRIPTION OF THE DRAWINGS

The features, advantages and technical effects of the exemplary embodiments of the present application will be described below with reference to the accompanying drawings.

Wherein:
100—nacelle cover;
10—cover casing; 10a—accommodating chamber;
11—first plate; 111—first plate unit; 111a—first bending portion; 111b—the first extending portion;
12—second plate; 121—second plate unit; 121a—second bending portion; 121b—second extending portion;
13—support beam; 13a—first mounting plate; 13b—second mounting plate; 13c—inclined plate; 131—first surface; 132—second surface; 133—cavity; 134—opening;
14—positioning portion; 141—fixing body; 141a—installation groove; 141b—first through groove; 141c—second through groove; 142—insertion body;
15—protrusion;
16—mounting hole;
20—fasteners;
30—support platform;
40—first adapter seat; 41—first connecting portion; 42—second connecting portion;
50—truss;
60—second adapter seat; 61—transition section; 62—first installation section; 63—second installation section;
70—first end plate; 80—second end plate; X—extending direction;
200—tower; 300—generator; 400—impeller; 401—hub; 402—blade; 500—wind turbine foundation.

In the drawings, the same components are given the same reference numerals. The accompanying drawings are not drawn to actual scale.

DETAILED DESCRIPTION

Features and exemplary embodiments of various aspects of the present application will be described in detail below, and numerous specific details are disclosed in the following detailed description to provide a thorough understanding of the present application. However, it will be apparent to the person skilled in the art that the present application may be practiced without some of these specific details. The following description of the embodiments is merely to provide a better understanding of the present application by illustrating examples of the present application. In the accompanying drawings and the following description, at least some well-known structures and techniques are not shown in order to avoid unnecessarily obscuring the present application; and, the dimensions of some structures may be exaggerated for clarity. Furthermore, the features, structures or characteristics described below may be combined in any suitable manner in one or more embodiments.

The orientation words appearing in the following description all refer to directions shown in the accompanying drawings, and are not intended to limit the specific structures of the nacelle cover and the wind turbine generator of the present application. In the description of this application, it should also be noted that, unless otherwise clearly specified and limited, the terms "installation" and "connection" should be understood in a broad sense, for example, it may be a fixed connection, a detachable connection, or an integral connection, and may be a direct connection or an indirect connection. For the person skilled in the art, the specific meanings of the above terms in the present application can be understood according to specific circumstances.

For a better understanding of the present application, the nacelle cover and the wind power generator according to the embodiments of the present application will be described in detail below with reference to FIGS. 1 to 10.

Figure 1:
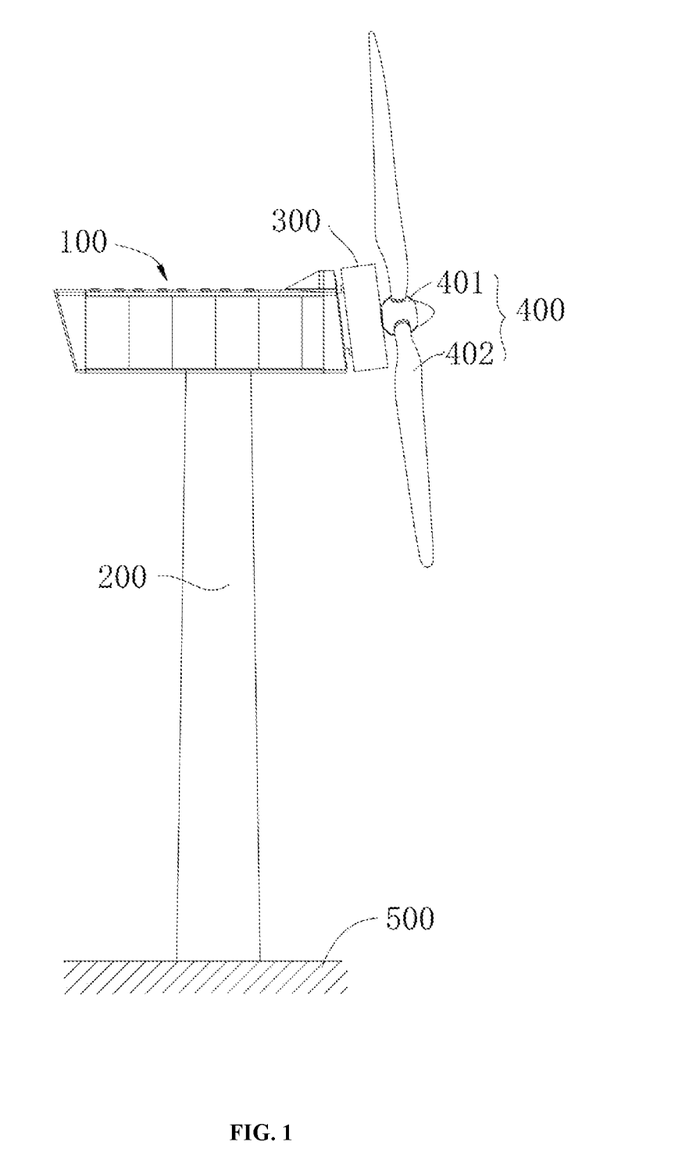
FIG. 1 is a schematic structural diagram of a wind turbine generator according to an embodiment of the present application.
Figure 2:
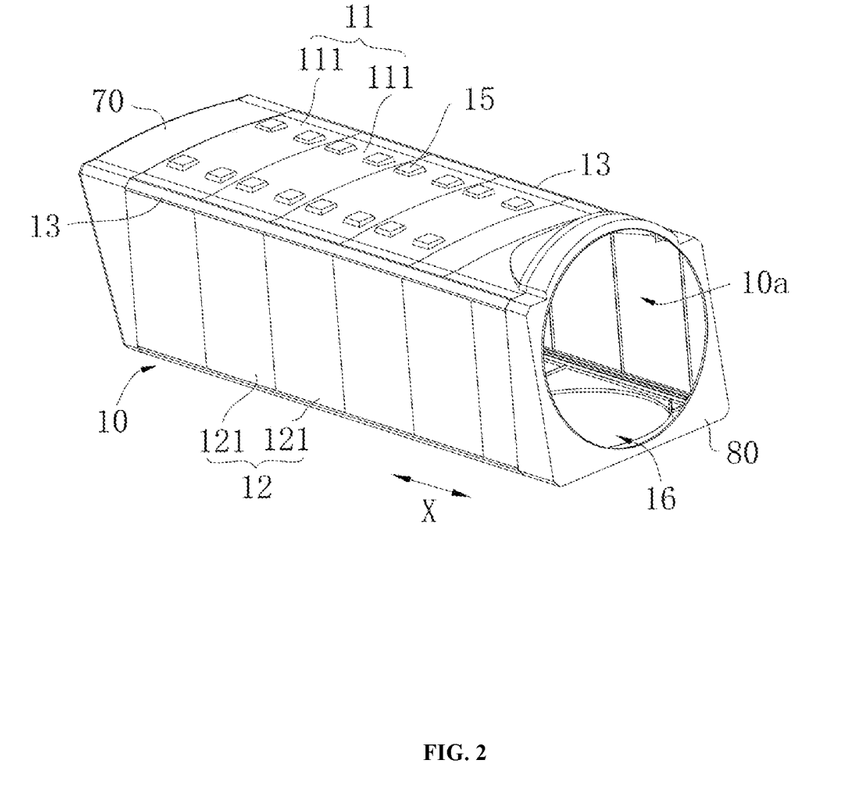
FIG. 2 is a schematic structural diagram of a nacelle cover as a whole according to an embodiment of the present application.
Figure 3:
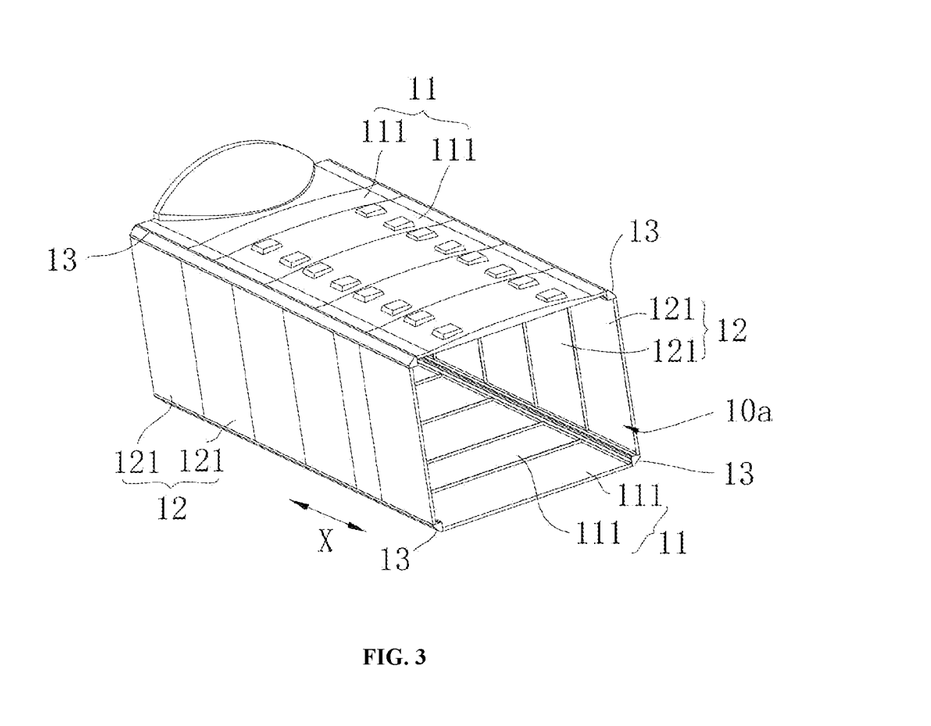
FIG. 3 is a schematic structural diagram of a part of a nacelle cover according to an embodiment of the present application.
Figure 4:
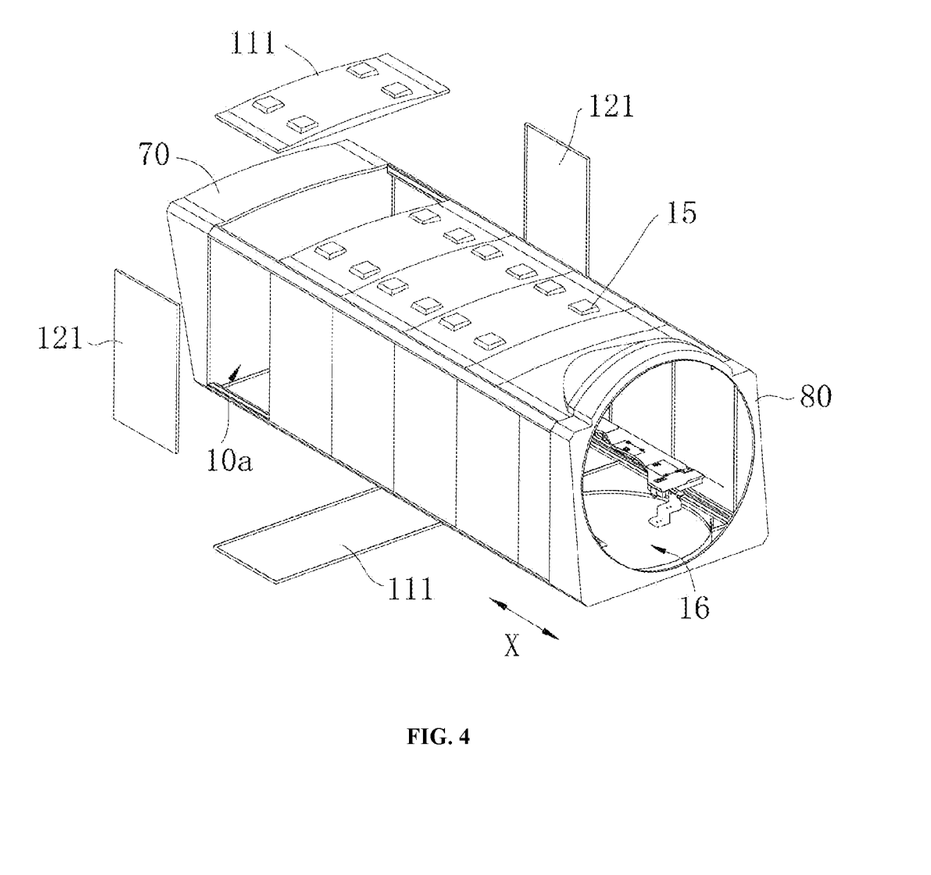
FIG. 4 is a partially disassembled structural schematic diagram of a nacelle cover according to an embodiment of the present application.

Referring to FIG. 1, an embodiment of the present application provides a wind turbine generator, and the wind turbine generator mainly includes a wind turbine foundation 500, a tower 200, a nacelle, a generator 300 and an impeller 400. The tower 200 is connected to the wind turbine foundation 500, and the nacelle is disposed on a top of the tower 200. The nacelle includes a nacelle cover 100, and components such as converters and transformers are disposed inside the nacelle cover 100. The generator 300 is disposed at the nacelle. The impeller 400 includes a hub 401 and a plurality of blades 402 connected to the hub 401, and the impeller 400 is connected to a rotating shaft of the generator 300 through the hub 401. When the wind acts on the blades 402, the entire impeller 400 and the rotating shaft of the generator 300 are driven to rotate, so as to convert the wind energy into electrical energy.

In order to better satisfy the requirements of protecting the components such as the transformers, converters, located inside the nacelle and ensure the power generation requirements of the wind turbine generator, the embodiments of the present application provide a new type of nacelle cover 100, which can be independently produced or sold as an independent component, and certainly, can also be used in the above-mentioned wind turbine generator and serve as a component of the wind turbine generator.

Referring to FIG. 2 to FIG. 7 in combination, the nacelle cover 100 provided by the embodiment of the present application includes a cover casing 10 and a fastener 20, and the nacelle cover 100 includes first plates 11, second plates 12 and at least one support beam 13, wherein the first plates 11 and the second plates 12 are alternately arranged, and adjacent first plate 11 and second plate 12 in at least one group are spaced apart from each other and hold the support beam 13 between them. The first plates 11, the second plates 12 and the support beams 13 are connected and jointly form an accommodating chamber 10a. There are two or more fasteners 20, which are disposed in the accommodating chamber 10a, at least one fastener 20 extends from the first plate 11 into the support beam 13 and detachably connects the first plate 11 to the support beam 13, and at least one fastener 20 extends from the second plate 12 into the support beam 13 and detachably connects the second plate 12 to the support beam 13.

The nacelle cover 100 provided by the embodiments of the present application can satisfy the requirements of protecting multiple components of the wind turbine generator and have a high strength, and meanwhile, since the fasteners 20 extend from the corresponding first plate 11 and second plate 12 into the support beam 13, the disassembly and assembly of the plates with the support beam 13 can be implemented inside the nacelle cover 100, and thus the disassembly, assembly and maintenance are facilitated with higher safety performance.

As an optional implementation, the number of the first plates 11 and the second plates 12 can be set according to the shape requirements of the nacelle cover 100. In some optional examples, each of the number of the first plates 11 and the second plates 12 can be two, and further may be more than two, for example, three, four or even more.

In some optional embodiments, both of the first plates 11 and the second plates 12 may be formed as flat plates, so that a cross section of the nacelle cover 100 as a whole is in a polygonal shape. Certainly, in some other examples, both of the first plates 11 and the second plates 12 further may be formed as curved plates, so that a cross section of the nacelle cover 100 as a whole is substantially in a circular shape.

As an optional embodiment, the adjacent first plate 11 and second plate 12 in each group are spaced apart from each other and hold the support beam 13 between them, and each support beam 13 is at least partially located outside the accommodating chamber 10a. With the above configuration, not only the strength of the nacelle cover 100 as a whole can be improved, but also each of the first plate 11 and the second plate 12 can be held between two adjacent support beams 13, thereby facilitating the disassembly and assembly of the first plate 11 and the second plate 12 with the corresponding support beams 13 through the fasteners 20 and further ensuring the operation safety of the operators. Further, by limiting the support beam 13 to be at least partially located outside the accommodating chamber 10a, contact areas of the support beam 13 with the corresponding first plate 11 and the second plate 12 can be increased, thereby better ensuring the connection strength of the support beam 13 with the first plate 11 and the second plate 12.

In some optional examples, the support beam 13 is formed as a prismatic member and includes a first surface 131 and a second surface 132 which are arranged to intersect with each other, and among the first plate 11 and the second plate 12 that are disposed adjacently and hold the support beam 13, the first plate 11 is attached to the first surface 131 and is connected to the support beam 13 by at least one fastener 20, and the second plate 12 is attached to the second surface 132 and is connected to the support beam 13 by at least one fastener 20. By limiting the support beam 13 to include the first surface 131 and the second surface 132 which are arranged to intersect with each other, the attachment of the support beam 13 to the corresponding first plate 11 and the second plate 12 can be facilitated, thereby further increasing the contact areas of the support beam 13 with the first plate 11 and the second plate 12, and better satisfying the requirements that the fasteners 20 extend into the support beam 13 from the inside of the accommodating chamber 10a of the nacelle cover 100 and connect the first plate 11 and the second plate 12 to the support beam 13 respectively.

Further, by limiting the first surface 131 and the second surface 132 to intersect with each other, the adjacent first plate 11 and the second plate 12 can made to intersect with each other, thereby facilitating the formation of the accommodating chamber 10a of the nacelle cover 100.

In some optional embodiments, the first surface 131 and the second surface 132 are perpendicular to each other, which can better satisfy the requirements of respectively connecting the first plate 11 and the second plate 12 to the support beam 13 through the fasteners 20.

Optionally, the fasteners 20 may be bolts, screws or other components capable of detachably connecting the first plate 11 and the second plate 12 to the support beam 13 respectively.

In some optional embodiments, the first plate 11 is provided with a first bending edge that is bent toward the inside of the accommodating chamber 10a, on a side facing the corresponding support beam 13, and the first plate 11 can abut against the first surface 131 through the first bending edge and is detachably connected to the support beam 13 through the fasteners 20. Similarly, the second plate 12 is provided with a second bending edge that is bent toward the inside of the accommodating chamber 10a, on a side facing the corresponding support beam 13, and the second plate 12 can abut against the second surface 132 through the second bending edge and is detachably connected to the support beam 13 by the fasteners 20. With the above configuration, the operators can disassemble and assemble the first plate 11 and the second plate 12 inside the accommodating chamber 10a, and thus the maintenance is more convenient.

Continuing to refer to FIG. 2 to FIG. 7, as an optional embodiment, the support beam 13 includes a cavity 133 which penetrates through the support beam 13 along an extending direction X of the support beam 13, a positioning portion 14 is provided in the cavity 13, and the fastener 20 is detachably connected to the support beam 13 through the positioning portion 14. By defining the support beam 13 to include the cavity 133 which penetrates through the support beam 13 along the extending direction X of the support beam 13, the effects of weight and cost reduction of the support beam can be achieved. Meanwhile, the ends of the fasteners 20 that extend outward from the inside of the accommodating chamber 10a and connect the first plate 11 or the second plate 12 to the support beam 13, can be protected by the support beam 13, and thus can be avoided from being eroded and corroded by rainwater or the like, thereby improving the service life of the fastener 20. Therefore, the maintenance cost of the nacelle cover 100 is reduced, the safe and stable operation of the wind turbine generator applied with the nacelle cover 100 is ensured, and the power generation benefit is ensured. Moreover, by disposing the positioning portion 14 inside the cavity 133, the connection between the fasteners 20 and the support beam 13 can be more facilitated, and the thickness of the side wall of the support beam 13 for connecting and forming the cavity 133 can be reduced, thereby better satisfying the requirements of weight and cost reduction.

In some optional embodiments, an inner side of the first surface 131 and an inner side of the second surface 132 are each provided with the positioning portion 14, so as to ensure that the fasteners 20 for connecting the support beam 13 to the first plate 11 and the second plate 12 all can be effectively connected and fixed.

Figure 5:
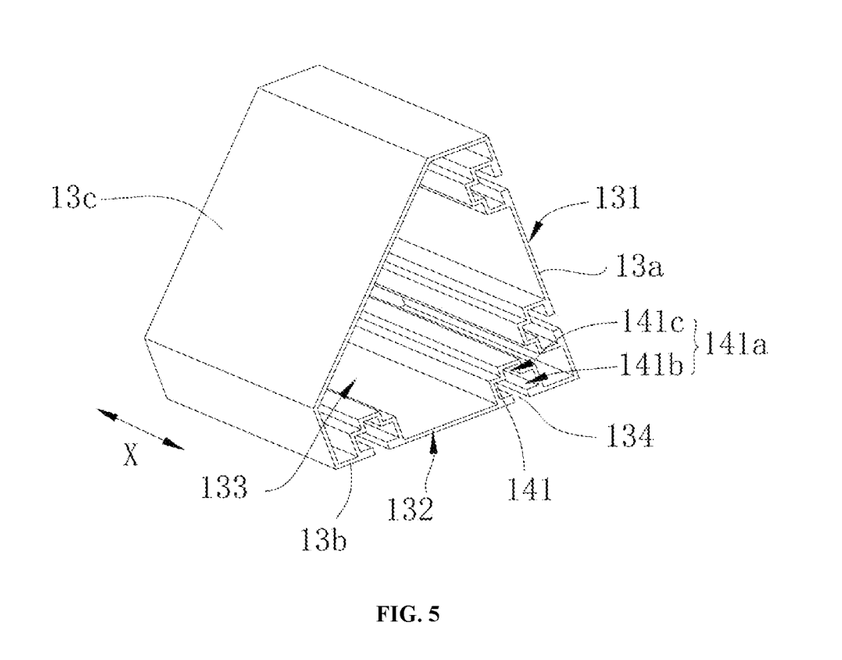
FIG. 5 is a schematic structural diagram of a support beam according to an embodiment of the present application.
Figure 6:
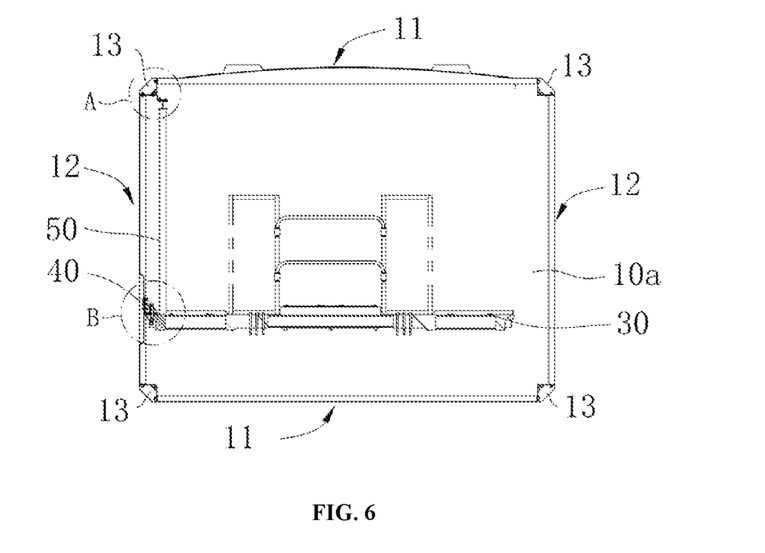
FIG. 6 is a schematic cross-sectional structural diagram of a nacelle cover according to an embodiment of the present application.
Figure 7:
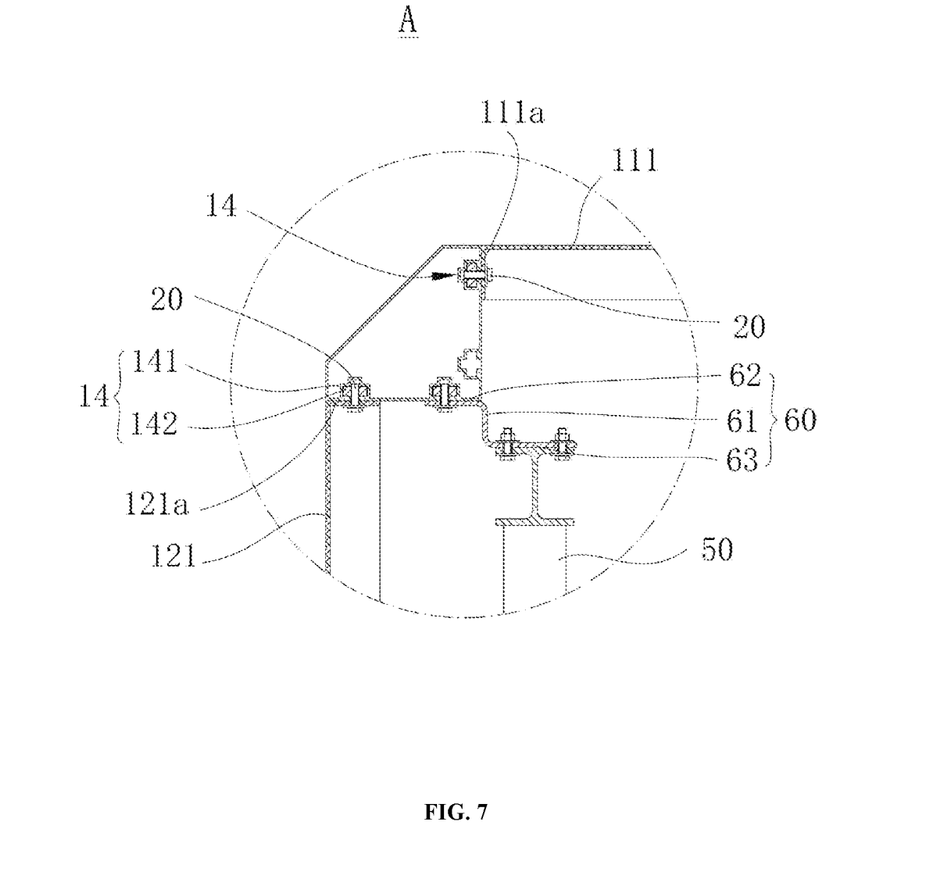
FIG. 7 is an enlarged view of portion A in FIG. 6.
Figure 8:
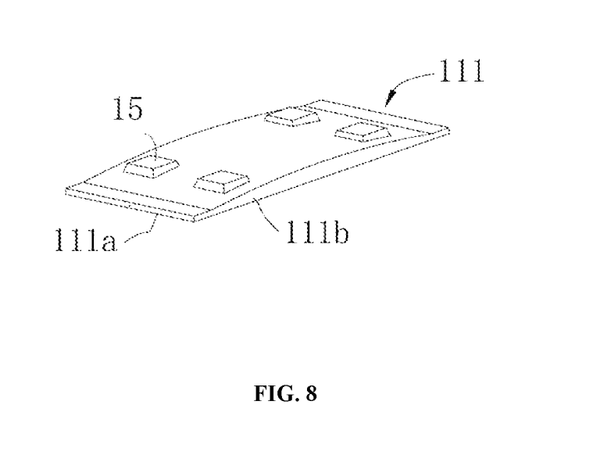
FIG. 8 is a schematic structural diagram of a first plate unit according to an embodiment of the present application.
Figure 9:
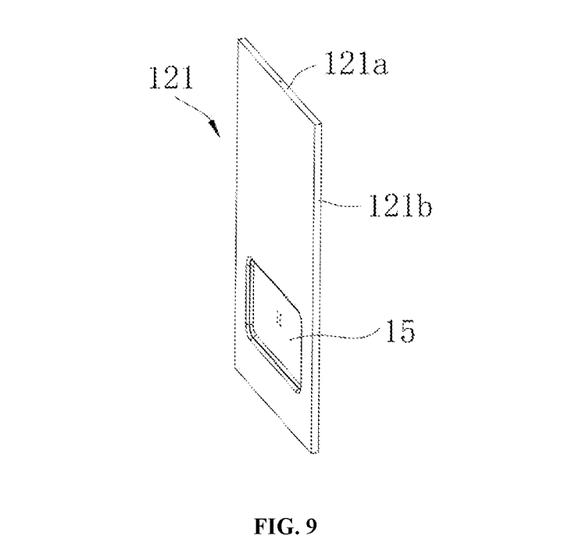
FIG. 9 is a schematic structural diagram of a second plate unit according to an embodiment of the present application.
Figure 10:
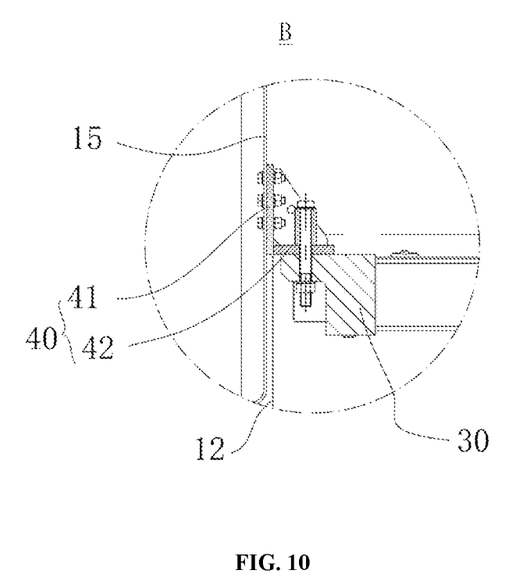
FIG. 10 is an enlarged view of portion B in FIG. 6.

Continuing to refer to FIG. 5 to FIG. 7, optionally, the positioning portion 14 may include a fixing body 141 and an insertion body 142, the fixing body 141 includes an installation groove 141a, the insertion body 142 is inserted into the installation groove 141a and is detachably connected to the fixing body 141, and the positioning portion 14 is connected to the support beam 13 through the fixing body 141 and is detachably connected to the fastener 20 through the insertion body 142. By adopting the above-mentioned configuration, the positioning portion 14 can not only satisfy the requirements of the detachable connection between the fastener 20 and the support beam 13, but also, due to the detachable connection between the insertion body 142 and the installation groove 141a, can allow replacement of the insertion body 142, thereby avoiding the failure of the entire support beam 13 due to the damage of the insertion body 142.

As an optional implementation, the fixing body 141 and the support beam 13 are integrally formed, which facilitates the forming of the fixing body 141 and also can ensure the connection strength between the fixing body 141 and the support beam 13. Optionally, the installation groove 141a penetrates at least one end of the fixing body 141 along the extending direction X of the support beam 13, and optionally penetrates through the at least one end of the fixing body 141 in the extending direction X.

As an optional implementation, the fixing body 141 includes a first through groove 141b and a second through groove 141c in communication with the first through groove 141b in it, and with respect to a length direction or the extending direction X of the support beam 13, a cross section enclosing the first through groove 141b is larger than a cross section enclosing the second through groove 141c. That is, a cross-section of a wall of the fixing body 141 for enclosing and forming the installation groove 141a with respect to the length direction of the support beam 13 is in a shape of a Chinese character "冂" as a whole.

The insertion body 142 may be located in the first through groove 141b, and the fastener 20 for connecting the first plate 11 to the support beam 13 or for connecting the second plate 12 to the support beam 13 penetrates through the insertion body 142 and extends to the second through groove 141c. By adopting the above-mentioned configuration, the fixing body 141 can not only satisfy the installation requirements of the insertion body 142 and ensure the fixing requirements of the fastener 20, but also can be applicable to the fixing of the first plate 11 and second plate 12 of different thicknesses by adjusting the screw-in depth of the fastener 20.

In some optional examples, the support beam 13 includes an opening 134 in communication with each installation groove 141a, and the fastener 20 extends into the installation groove 141 through the opening 134 opposite to the fastener 20 and is threadedly connected to the insertion body 142. By the above configuration, it not only can facilitate the fastener 20 to protrude outward and into the support beam 13 from the accommodating chamber 10a, but also can facilitate the fastener 20 to slide along the extending direction X of the support beam 13, so that the first plate 11 and/or the second plate 12 can be disassembled and assembled by pulling the insertion body 142, thereby providing various forms for the disassembly and assembly of the first plate 11 and the second plate 12.

In some optional examples, the support beam 13 includes a first mounting plate 13a and a second mounting plate 13b which are arranged to intersect with each other, the first surface 131 is located on the first mounting plate 13a, and the second surface 132 is located on the second mounting plate 13b. Optionally, the support beam 13 further includes an inclined plate 13c located between the first mounting plate 13a and the second mounting plate 13b, a main body of the inclined plate 13c is arranged to intersect with the first mounting plate 13a and the second mounting plate 13b, an end of the main body facing the first mounting plate 13a is inclined toward the first mounting plate 13a and is arranged perpendicular to the first mounting plate 13a, and an end of the main body of the inclined plate 13c facing the second mounting plate 13b is inclined toward the second mounting plate 13b and is arranged perpendicular to the second mounting plate 13b. The first mounting plate 13a, the second mounting plate 13b and the inclined plate 13c are connected to form a trapezoid as a whole, and the formed cavity 133 is a trapezoidal cavity. By adopting the above structural form, which is an optional optimized form, the support beam, on the basis of satisfying the overall strength enhancement of the nacelle cover and the connection requirements between the first plate 11 and the second plate 12, can further improve the stability of the nacelle cover 100, improve the force applied on the first plate 11 and the second plate 12, lower requirements on material properties, and further reduce costs.

Referring to FIG. 4 to FIG. 8 in combination, as an optional implementation, in the nacelle cover 100 provided by the above embodiments, at least one first plate 11 includes two or more first plate units 111, and the two or more first plate units 111 are arranged successively along the extending direction X of the support beam 13; each first plate unit 111 includes a first bending portion 111a and a first extending portion 111b extending into the accommodating chamber 10a, the first extending portions 111b of two adjacent first plate units 111 abut against each other and are detachably connected to each other, the first bending portion 111a of each first plate unit 111 is pressed against the support beam 13, and the first bending portion 111a of at least one first plate unit 111 is connected to the support beam 13 by the fastener 20. The first bending portions 111a of all the first plate units 111 jointly constitute the above-mentioned first bending edge.

By adopting the above-mentioned structural form, the first plate 11 can not only satisfy the protection requirements for the internal components of the nacelle cover 100, but also can facilitate mass-production and transportation of the first plate units 111, which can significantly reduce difficulty and cost of production and transportation. Each first plate unit 111 can be applied to one or more types of wind turbine generators, and it is only necessary to exchange the support beam 13 to different specifications, the first plate units 111 can be assembled into the nacelle cover 100 of various specifications to satisfy the requirements of multiple types of generators, which make the nacelle cover 100 to have greater flexibility and universality.

Referring to FIG. 4 to FIG. 9 in combination, as an optional implementation, in the nacelle cover 100 provided by the above embodiments, at least one second plate 12 includes two or more second plate units 121, and the two or more second plate units 121 are arranged successively along the extending direction X of the support beam 13; each second plate unit 121 includes a second bending portion 121a and a second extending portion 121b extending into the accommodating chamber 10a. The second extending portions 121b of two adjacent second plate units 121 abut against each other and are detachably connected to each other, the second bending portion 121a of each second plate unit 121 is pressed against the support beam 13, and the second bending portion 121a of at least one second plate unit 121 is connected to the support beam 13 by the fastener 20. The second bending portions 121a of all the second plate units 121 jointly constitute the above-mentioned second bending edge.

Similarly, by adopting the above-mentioned structural form, the second plate 12 can not only satisfy the protection requirements for the internal components of the nacelle cover 100, but also can facilitate mass-production and transportation of the second plate units 121, which can significantly reduce difficulty and cost of production and transportation. Each second plate unit 121 can be applicable to one or more types of wind turbine generators, and it is only necessary to exchange the support beam 13 to different specifications, the second plate units 121 can be assembled into the nacelle cover 100 of various specifications to satisfy the requirements of multiple types of generators, which make the nacelle cover 100 to have greater flexibility and universality.

In a specific implementation, each first plate 11 may include two or more first plate units 111, each second plate 12 may include two or more second plate units 121, and the number of the first plate units 111 and the second plate units 112 can be adjusted flexibly according to the specification of the nacelle cover 100, so as to better meet the requirements of different types of nacelle covers 100 and ensure that the first plate units 111 and the second plate units 121 can be reused.

Optionally, the first plate unit 111 and the second plate unit 121 may have the same structure, and by the above configuration, mass production of the corresponding plate units of the nacelle cover 100 can be achieved to the greatest extent.

As an optional implementation, in the nacelle cover 100 provided in the above embodiments, the cover casing 10 further includes a protrusion 15, and a surface of at least one first plate 11 close to and/or away from the accommodating chamber 10a is provided with the protrusion 15. That is, the protrusion 15 may be located inside the accommodating chamber 10a, and certainly, in some other examples, may be located outside the accommodating chamber 10a, and when located outside the accommodating chamber 10a, the protrusion 15 can further be used as an installation fulcrum for components of the wind turbine generator located outside the nacelle cover 100 to better satisfy the usage requirements of the wind turbine generator.

In some optional examples, the protrusion 15 is provided on a surface of at least one second plate 12 close to the accommodating chamber 10a, and the protrusion 15 located on the second plate 12 may also be located inside the accommodating cavity 10a, and certainly may located outside the accommodating chamber 10a, and when located inside the accommodating chamber 10a, the protrusion 15a can further be used to connect with components located inside the accommodating chamber 10a.

In a specific implementation, the protrusion 15 may be connected to the first plate 11 and the second plate 12 by welding, and certainly, in some other examples, the protrusion 15 may further be formed by pressing the first plate 11 and the second plate 12, as long as the reinforcement and connection requirements can be satisfied.

Optionally, in a specific implementation, the protrusion 15 may be located on the first plate units 111 corresponding to the first plate 11 and on the second plate units 121 corresponding to the second plate 12.

Referring to FIG. 6 to FIG. 10 in combination, as an optional implementation, the nacelle cover 100 of the above-mentioned embodiments further includes a support platform 30 and a first adapter seat 40 disposed in the accommodating chamber 10a, and the support platform 30 is detachably connected to a surface of at least one first plate 11 and/or at least one second plate 12 facing the accommodating chamber 10a through the first adapter seat 40. By providing the first adapter seat 40, when the nacelle cover 100 includes the support platform 30, the support platform 30 can be connected to the first plate 11 and/or the second plate 12 through the first adapter seat 40, so that not only the installation requirements of the support platform 30 can be satisfied, but also the connection strength of the support platform 30 can be ensured, and meanwhile, the disassembly and assembly process of the support platform 30 can be simplified.

Optionally, the first adapter seat 40 may include a first connecting portion 41 and a second connecting portion 42 which are arranged to intersect with each other, and the first adapter seat 40 is detachably connected to the first plate 11 and/or the second plate 12 through the first connecting portion 41, and is detachably connected to the support platform 30 through the second connecting portion 42. By adopting the above-mentioned form, the first adapter seat 40 has a simplified structure and low cost, and meanwhile, can satisfy the connection requirements with the support platform 30 and the first plate 11 and/or the second plate 12.

As an optional implementation, both of the first connecting portion 41 and the second connecting portion 42 may be formed as plate-like members, which can increase the contact areas of the support platform 30 with the first plate 11 and/or the second plate 12, so as to better ensure the connection strength between the support platform 30 and the first plate 11 and/or the second plate 12.

In some optional embodiments, the first connecting portion 41 and the second connecting portion 42 are perpendicular to each other, which can optimize the force applied to the support platform 30 and the first plate 11 and/or the second plate 12, thereby improving the safety performance of the nacelle cover 100.

In some optional examples, when the first plate 11 and/or the second plate 12 include the protrusion 15, the first connecting portion 41 may be connected to the first plate 11 and/or the second plate 12 through the protrusion 15, which can effectively avoid the damage to the first plate 11 and/or the second plate 12, thereby ensuring the service life of the nacelle cover 100.

Continuing to refer to FIGS. 6 to 10, in some optional embodiments, the nacelle cover 100 further includes a truss 50 and a second adapter seat 60, one end of the truss 50 is connected to the support beam 13 through the second adapter seat 60, and the other end of the truss 50 is connected to the support platform 30. By providing the truss 50, the bearing capacity of the support platform 30 can be further improved, and the safety performance of the wind turbine generator can be better ensured.

As an optional implementation, the second adapter seat 60 may include a transition section 61, a first installation section 62 and a second installation section 63, and the first installation section 62 and the second installation section 63 are respectively located on two sides of the transition section 61 and extend opposite each other. The second adapter seat 60 is connected to the support beam 13 through the first installation section 62 and is connected to the truss 50 through the second installation section 63. By adopting the above form, the second adapter seat 60 has a simple structure, is easy to manufacture, and can ensure the connection requirements between the truss 50 and the support beam 13.

Optionally, the transition section 61, the first installation section 62 and the second installation section 63 may be formed into an integral member, thereby being easy to form, and being able to ensure the connection strength among the three.

Optionally, each of the transition section 61, all of the first installation section 62 and the second installation section 63 are formed as plate-like members, and the first installation section 62 and the second installation section 63 are respectively perpendicular to the transition section 61, so that, on the basis of satisfying the connection requirements between the truss 50 and the support beam 13, the force applied to the truss 50 and the support beam 13 can be further optimized, and the service life of the nacelle cover 100 can be improved.

Optionally, when the second adapter seat 60 is connected to the support beam 13, it can be connected to the support beam 13 through the fasteners 20 for connecting the second plate 12 and the support beam 13; by the above configuration, not only the connection requirements between the second adapter seat 60 and the support beam 13 can be satisfied, but also the nacelle cover 100 can be further simplified and easy to form.

As an optional implementation, the cover casing 10 further includes a first end plate 70 and a second end plate 80, the first end plate 70 is located at one end of the support beam 13 along the extending direction X of the support beam 13 and is connected to the support beam 13, and the second end plate 80 is located at the other end of the support beam 13 along the extending direction X of the support beam 13 and is connected to the support beam 13. By providing the first end plate 70 and the second end plate 80, the protection requirements of the nacelle cover 100 for the internal components of the wind turbine generator can be better ensured. Meanwhile, the cover casing 10 can be connected to the devices such as the hub 401 through the second end plate 80, the power generation benefit of the wind turbine generator can be ensured.

Optionally, in order to facilitate the connection with the tower 200, optionally, the nacelle cover 100 is provided with a mounting hole 16 on the first plate 11 disposed close to the tower 200, so as to be connected with the tower 200 through a yaw system.

Based on the above contents, the nacelle cover 100 provided in the embodiments of the present application includes the cover casing 10 and the fasteners 20, and the cover casing 10 includes the accommodating chamber 10a, and thus the nacelle cover 100 can be used to accommodate multiple other components of the wind turbine generator and provide protection for the various components. By limiting that the adjacent first plate 11 and second plate 12 in at least one group hold the support beam 13 between them, and meanwhile, limiting that the fasteners 20 are disposed in the accommodating chamber 10a and extend into the support beam 13 from the corresponding first plates 11 and the second plates 12 so as to detachably connect the corresponding plates with the support beam 13, not only the transportation and assembly of the nacelle cover 100 can be facilitated, but also the arrangement of the support beam 13 can greatly improve the strength of the formed nacelle cover 100, thereby ensuring the stability and service life of the wind turbine generator.

Since the fasteners 20 are disposed inside the accommodating chamber 10a and detachably connect the plates with the support beam 13, the fasteners 20 can work for a long time and are not easily corroded. In addition, by the above configuration, the operators can complete the disassembly and assembly of the corresponding plates and the support beam 13 by screwing the fasteners 20 and maintain and/or replace the assembled fasteners 20 inside the nacelle cover 100, the operators can be avoided from performing the above operations outside the nacelle cover 100. Therefore, the nacelle cover 100 provided in the embodiments of the present application is also convenient for assembly and maintenance.

Meanwhile, by limiting the first plate 11 to the structural form of more than two first plate units 111 and the connection requirements thereof, and/or limiting the second plate 12 to the structural form of more than two second plate units 121 and the connection requirements thereof, the nacelle cover 100 is easy to be mass-produced and transported, which can significantly reduce the difficulty and cost of production and transportation. Moreover, the requirements of various generators for different structural forms of the nacelle cover 100 can be satisfied better, and thus the casing of the nacelle cover 100 has greater flexibility and universality.

The wind turbine generator provided in the embodiments of the present application includes the nacelle cover 100 of the above-mentioned embodiments, and thus has high safety performance, and can ensure the safety of operators when maintaining the nacelle cover 100 and internal devices, thereby being easy to promote and use.

While the present application has been described with reference to the preferred embodiments, various modifications may be made and components thereof may be replaced by equivalents without departing from the scope of the present application. In particular, as long as there is no structural conflict, each technical feature mentioned in each embodiment can be combined in any manner. The present application is not limited to the specific embodiments disclosed herein, but includes all technical solutions falling within the scope of the claims.

The invention claimed is:

1. A nacelle cover, comprising:
a cover casing, comprising a set of first plates, a set of second plates, and at least one support beam, the set of first plates and the set of second plates being alternately arranged, a first plate from the set of first plates and a second plate from the set of second plates which are adjacent to each other being spaced apart from each other and holding a support beam from the at least one support beam between them, and the set of first plates, the set of second plates, and the at least one support beam being connected and jointly forming an accommodating chamber;
two or more fasteners disposed in the accommodating chamber, and comprising at least one first fastener detachably connecting the first plate to the support beam and at least one second fastener detachably connecting the second plate to the support beam; and
a support platform and a first adapter seat disposed in the accommodating chamber, wherein the first adapter seat comprises a first connecting portion and a second connecting portion which are arranged to intersect with each other, the first adapter seat is detachably connected to the first plate or the second plate through the first connecting portion, and the first adapter seat is detachably connected to the support platform through the second connecting portion.

2. The nacelle cover according to claim 1, wherein each of the at least one support beam is at least partially located outside the accommodating chamber.

3. The nacelle cover according to claim 1, wherein the support beam is formed as a prismatic member and comprises a first surface and a second surface which are arranged to intersect each other, the first plate is attached to the first surface and is connected to the support beam through the at least one first fastener, and the second plate is attached to the second surface and is connected to the support beam through the at least one second fastener.

4. The nacelle cover according to claim 3, wherein the support beam comprises a cavity, the cavity penetrates through the support beam along an extending direction of the support beam, a set of positioning portions is disposed in the cavity, and the at least one first fastener and the at least second fastener are detachably connected to the support beam through the set of positioning portions, respectively.

5. The nacelle cover according to claim 4, wherein each of an inner side of the first surface and an inner side of the second surface is provided with a respective positioning portion, each respective positioning portion comprises an insertion body and a fixing body with an installation groove, the insertion body is inserted into the installation groove and is detachably connected to the fixing body, and the respective positioning portion is connected to the support beam through the fixing body and is detachably connected to a corresponding fastener from the at least one first fastener or the at least one second fastener through the insertion body.

6. The nacelle cover according to claim 5, wherein the fixing body and the support beam are integrally formed, the installation groove penetrates through at least one end of the fixing body along the extending direction, the support beam comprises an opening communicating with the installation groove, the corresponding fastener extends into the installation groove through the opening which is opposite to the corresponding fastener, and the corresponding fastener is threadedly connected to the insertion body.

7. The nacelle cover according to claim 5, wherein a first through groove and a second through groove in communication with the first through groove are provided inside the fixing body, and with respect to the extending direction, a cross section enclosing the first through groove is larger than a cross section enclosing the second through groove, and
wherein the first through groove and the second through groove jointly form the installation groove, the insertion body is located in the first through groove, and the corresponding fastener penetrates through the insertion body and extends to the second through groove.

8. The nacelle cover according to claim 4, wherein the support beam comprises a first mounting plate, a second mounting plate and an inclined plate, the first mounting plate and the second mounting plate are arranged to intersect with each other, the first surface is located on the first mounting plate, the second surface is located on the second mounting plate, the inclined plate is arranged to intersect with the first mounting plate and the second mounting plate respectively, and the first mounting plate, the second mounting plate and the inclined plate enclose and form the cavity.

9. The nacelle cover according to claim 1, wherein:
the first plate comprises two or more first plate units, and the two or more first plate units are arranged successively along an extending direction of the support beam, and each of the two or more first plate units comprises a first bending portion and a first extending portion extending into the accommodating chamber; and first extending portions of two adjacent first plate units abut against each other and are detachably connected to each other, the first bending portion of each of the two or more first plate units is pressed against the support beam, and a corresponding first bending portion of at least one of the two or more first plate units is connected to the support beam through the at least one first fastener.

10. The nacelle cover according to claim 1, wherein:
the second plate comprises two or more second plate units, the two or more second plate units are arranged successively along an extending direction of the support beam, and each of the two or more second plate units comprises a second bending portion and a second extending portion extending into the accommodating chamber; and
second extending portions of two adjacent second plate units abut against each other and are detachably connected to each other, the second bending portion of each of the two or more second plate unis is pressed against the support beam, and a corresponding second bending portion of at least one of the two or more second plate units is connected to the support beam through the at least one second fastener.

11. The nacelle cover according to claim 1, wherein the support platform is detachably connected to a surface of the first plate or the second plate facing the accommodating chamber through the first adapter seat.

12. The nacelle cover according to claim 1, wherein the first connecting portion and the second connecting portion are both formed as plate-like members and are arranged perpendicular to each other.

13. The nacelle cover according to claim 11, further comprising a truss and a second adapter seat, wherein one end of the truss is connected to the support beam through the second adapter seat, and another end of the truss is connected to the support platform.

14. The nacelle cover according to claim 13, wherein the second adapter seat comprises a transition section, a first installation section and a second installation section, the first installation section and the second installation section are respectively connected to the transition section and extend opposite to each other, and the second adapter seat is connected to the support beam through the first installation section and is connected to the truss through the second installation section.

15. The nacelle cover according to claim 14, wherein the transition section, the first installation section and the second installation section are formed into an integral member.

16. The nacelle cover according to claim 15, wherein the transition section, the first installation section and the second installation section are formed as plate-like members, and the first installation section and the second installation section are respectively perpendicular to the transition section.

17. The nacelle cover according to claim 1, wherein the cover casing further comprises a first end plate and a second end plate, the first end plate is located at one end of the support beam along an extending direction of the support beam and is connected to the support beam, and the second end plate is located at another end of the support beam along the extending direction of the support beam and is connected to the support beam.

18. The nacelle cover according to claim 1, wherein:
the cover casing further comprises a protrusion; and
a surface of the first plate close to or away from the accommodating chamber is provided with the protrusion, or a surface of the second plate close to the accommodating chamber is provided with the protrusion.

19. A wind turbine generator, comprising:
a nacelle comprising a nacelle cover, wherein the nacelle cover comprises:
a cover casing, comprising a set of first plates, a set of second plates, and at least one support beam, the set of first plates and the set of second plates being alternately arranged, a first plate from the set of first plates and a second plate from the set of second plates which are adjacent to each other being spaced apart from each other and holding a support beam from the at least one support beam between them, and the set of first plates, the set of second plates, and the at least one support beam being connected and jointly forming an accommodating chamber;
two or more fasteners disposed in the accommodating chamber, and comprising at least one first fastener detachably connecting the first plate to the support beam and at least one second fastener detachably connecting the second plate to the support beam; and
a support platform and a first adapter seat disposed in the accommodating chamber, wherein the first adapter seat comprises a first connecting portion and a second connecting portion which are arranged to intersect with each other, the first adapter seat is detachably connected to the first plate or the second plate through the first connecting portion, and the first adapter seat is detachably connected to the support platform through the second connecting portion; and
a generator disposed at the nacelle.

20. The wind turbine generator according to claim 19, wherein each of the at least one support beam is at least partially located outside the accommodating chamber.

* * * * *